(12) United States Patent  
Fukumoto et al.

(10) Patent No.: US 10,170,947 B2  
(45) Date of Patent: Jan. 1, 2019

(54) LAMINATED CORE

(71) Applicant: Mitsui High-tec, Inc, Kitakyushu, Fukuoka (JP)

(72) Inventors: Takashi Fukumoto, Kitakyushu (JP); Jin Oda, Kitakyushu (JP); Shogo Tezuka, Kitakyushu (JP); Mei Ogata, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 480 days.

(21) Appl. No.: 14/499,877

(22) Filed: Sep. 29, 2014

(65) Prior Publication Data

US 2015/0097462 A1    Apr. 9, 2015

(30) Foreign Application Priority Data

Oct. 9, 2013 (JP) .................................. 2013-212046  
Sep. 10, 2014 (JP) .................................. 2014-184391

(51) Int. Cl.
*H02K 1/22* (2006.01)  
*H02K 1/12* (2006.01)  
(Continued)

(52) U.S. Cl.
CPC ................. *H02K 1/22* (2013.01); *H02K 1/06* (2013.01); *H02K 1/12* (2013.01); *H02K 15/02* (2013.01); *H02K 2201/09* (2013.01)

(58) Field of Classification Search
CPC ............ H02K 15/02; H02K 1/06; H02K 1/12; H02K 1/22; H02K 2201/09; H01F 41/02
(Continued)

(56) References Cited

U.S. PATENT DOCUMENTS 5,581,140 A * 12/1996 Futami .................. H02K 1/276  
310/156.53  
7,872,392 B2 * 1/2011 Haldemann .............. H02K 1/16  
310/216.045  
(Continued)

FOREIGN PATENT DOCUMENTS

CN 101300728 A 11/2008  
CN 203135606 U 8/2013  
(Continued)

OTHER PUBLICATIONS

Translation of foreign document DE 19962558 A1 (Year: 2001).*  
(Continued)

*Primary Examiner* — Alex W Mok  
(74) *Attorney, Agent, or Firm* — Westerman, Hattori, Daniels & Adrian, LLP

(57) ABSTRACT

A laminated core 10 including a plurality of laminated iron core pieces, each of the iron core pieces being connected in a laminating direction by filling resin in a plurality of resin holes penetrating the laminated core 10 in the laminating direction, and a method for manufacturing the laminated core 10, by making a junction area of an iron core piece (A) 13 and resin larger than a junction area of an iron core piece (U) 14 and resin, the iron core piece (A) 13 being provided on an end in an axial direction, the iron core pieces (U) 14 being arranged at positions other than the end in the axial direction, or by providing locking portions at tip portions of resin, acquired joint strength of the iron core piece (A) 13.

6 Claims, 14 Drawing Sheets

(51) Int. Cl.
*H01F 41/02* (2006.01)
*H02K 1/06* (2006.01)
*H02K 15/02* (2006.01)

(58) Field of Classification Search
USPC .................................. 156/305; 310/216.048
See application file for complete search history.

(56) References Cited

U.S. PATENT DOCUMENTS

| | | | |
|---|---|---|---|
| 2003/0151327 A1* | 8/2003 | Ramirez | H02K 15/024 |
| | | | 310/216.062 |
| 2005/0039948 A1* | 2/2005 | Asai | H05K 3/387 |
| | | | 174/262 |
| 2006/0186752 A1* | 8/2006 | Matsumoto | H02K 1/276 |
| | | | 310/156.53 |
| 2009/0174273 A1 | 7/2009 | Watanabe et al. | |
| 2011/0083467 A1* | 4/2011 | Asano | F25B 49/025 |
| | | | 62/498 |
| 2013/0031773 A1* | 2/2013 | Matsuyama | H02K 15/0062 |
| | | | 29/596 |
| 2013/0234363 A1* | 9/2013 | Nagai | H02K 15/03 |
| | | | 264/261 |
| 2014/0042834 A1 | 2/2014 | Asahi et al. | |
| 2014/0124978 A1* | 5/2014 | Mabu | H01F 7/0221 |
| | | | 264/261 |

FOREIGN PATENT DOCUMENTS

| | | | | |
|---|---|---|---|---|
| DE | 19962558 A1 | * | 8/2001 | ............ H02K 1/12 |
| JP | 61180540 A | * | 8/1986 | ............ H02K 1/12 |
| JP | 2001-157394 A | | 6/2001 | |
| JP | 2002-34187 A | | 1/2002 | |
| JP | 2002-247784 A | | 8/2002 | |
| JP | 2003178930 A | * | 6/2003 | |
| JP | 2003-529309 A | | 9/2003 | |
| JP | 2006-115659 A | | 4/2006 | |
| JP | 2007-124791 A | | 5/2007 | |
| JP | 2007-282392 A | | 10/2007 | |
| JP | 2011-97742 A | | 5/2011 | |
| JP | 2012-115057 A | | 6/2012 | |
| JP | 2013-139085 A | | 7/2013 | |
| WO | 01/73924 A2 | | 10/2001 | |

OTHER PUBLICATIONS

First Notice of Reasons for Refusal dated Jul. 25, 2016, issued in counterpart Chinese Application No. 201410522845.7, with English translation. (19 pages).

Office Action dated May 23, 2017, issued in counterpart Japanese Application No. 2014-184391, with English ranslation (13 pages).

* cited by examiner

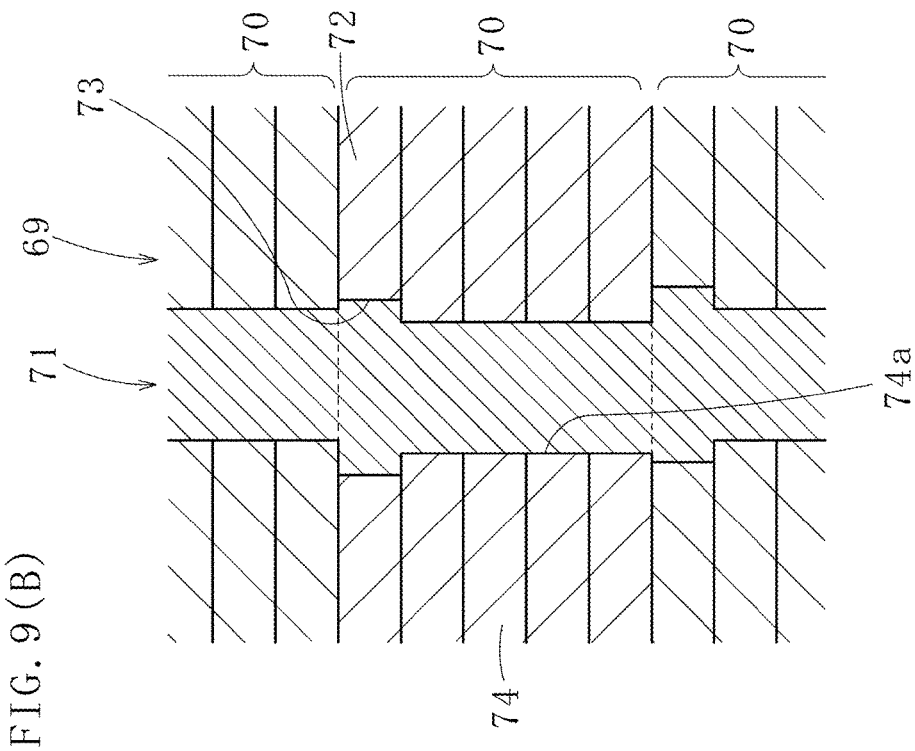
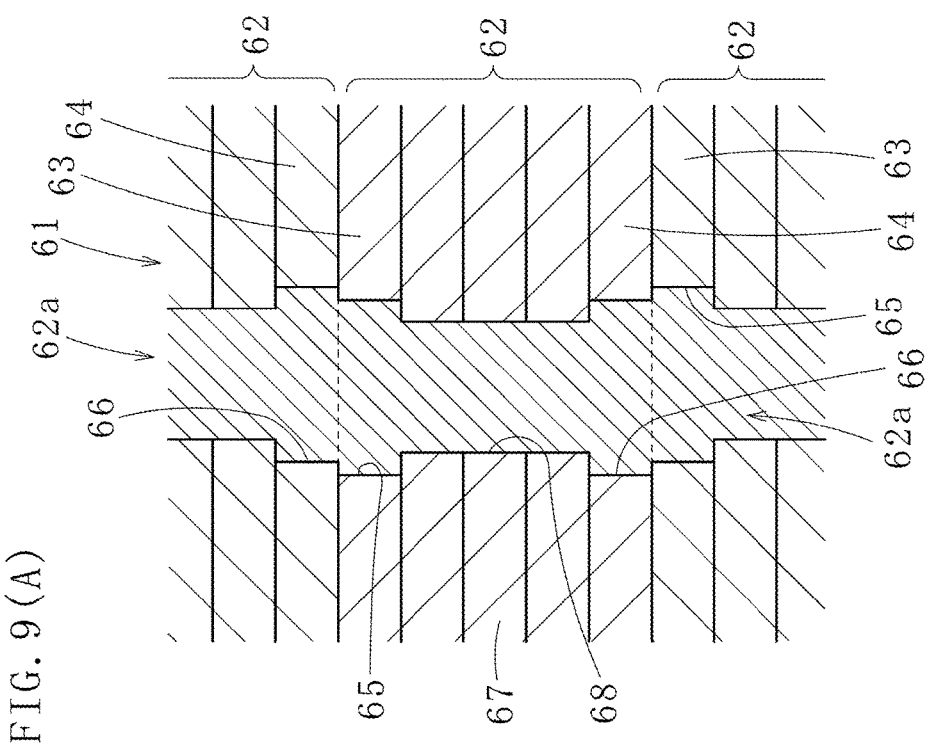

PRIOR ART

PRIOR ART

LAMINATED CORE

TECHNICAL FIELD

The present invention relates to a laminated core (including a laminated rotor core and a laminated stator core) in which each iron core piece is connected by resin filled in resin holes (through-holes), and to a manufacturing method thereof.

BACKGROUND ART

A widely-used method for manufacturing a laminated core is, for example, laminating iron core pieces with a thickness of 0.3 mm or less, and joining the iron core pieces by caulking, welding and the like. However, when iron core pieces are joined by caulking and welding, there is a problem in that the iron core pieces become conducted in a laminating direction, which generates eddy-current loss and lowers motor function.

In order to solve this problem, as illustrated in FIGS. 13(A) and 13(B), there is a method for manufacturing a laminated core 93 in which iron core pieces 90 are joined by injecting resin 92 in respective resin holes 91 and curing the resin, the resin holes 91 being formed by a plurality of through-holes provided to the iron core pieces 90 and made to be communicated in a laminating direction. Since the resin 92 is an insulator, the neighboring iron core pieces 90 do not become conducted, which prevents the generation of eddy-current loss (See Patent Literature 1).

CITATION LIST

Patent Literature

Patent Literature 1: Japanese Translation of PCT International Application Publication No. JP-T-2003-529309

SUMMARY OF INVENTION

Technical Problem

However, in a technique described in Patent Literature 1, when thermosetting resin or thermoplastic resin is used as the resin 92, right after injecting the resin 92 in the resin holes 91, as illustrated in FIG. 14(A), the resin 92 is filled all over inside the resin holes 91, possessing enough joint strength. But, since there is a difference in coefficient of thermal expansion between the iron core pieces 90 and the resin 92, the resin 92 shrinks more than the iron core pieces 90 do in a cooling process.

Consequently, as illustrated in FIG. 14(B), a bonded area (junction area) of the iron core piece 90 on the end in the laminating direction and the resin 92 decreases, which decreases the joint strength and detaches the iron core piece 90 on the end.

With respect to these problems, it is conceivable to add more resin holes or to enlarge diameters of the resin holes in order to enhance the joint strength. However, this causes a new problem in that an increase in the number of resin holes degrades magnetic property of a laminated core.

The present invention has been made in view of the above circumstances, and an object thereof is to provide a laminated core in which joint strength of an iron core piece provided on an end in an axial direction is increased and to provide a manufacturing method thereof in a laminated core in which each iron core piece is connected and joined mainly by resin and in a manufacturing method thereof.

Solution to Problem

In order to achieve the above object, according to a first aspect of the present invention, a laminated core includes a plurality of laminated iron core pieces, each of the iron core pieces being connected in a laminating direction by filling resin in a plurality of resin holes penetrating the laminated core in the laminating direction, and
joint strength of an iron core piece (A) among the iron core pieces is acquired by making a junction area of the iron core piece (A) and resin larger than a junction area of an iron core piece (U) among the iron core pieces and resin, the iron core piece (A) being provided on an end in an axial direction, the iron core piece (U) being arranged at a position other than the end in the axial direction.

According to a second aspect of the present invention, in the laminated core of the first aspect of the present invention, a cross-sectional area of a resin hole (B) of the iron core piece (A) is made larger than that of a resin hole (H) of the iron core piece (U).

According to a third aspect of the present invention, in the laminated core of the first aspect of the present invention, a diameter of the resin hole (B) of the iron core piece (A) is smaller than that of the resin hole (H) of the iron core piece (U).

According to a fourth aspect of the present invention, a laminated core includes a plurality of laminated iron core pieces, each of the iron core pieces being connected in a laminating direction by filling resin in a plurality of resin holes penetrating the laminated core in the laminating direction, and by providing locking portions in resin holes (B) of an iron core piece (A) among the iron core pieces, the locking portions being formed by resin to be filled in the resin holes (B), detachment of the iron core piece (A) from iron core pieces (U) among the iron core pieces is prevented, the iron core piece (A) being provided on an end in an axial direction, the iron core pieces (U) being provided at positions other than the end in the axial direction.

According to a fifth aspect of the present invention, in the laminated core of the fourth aspect of the present invention, the resin holes (B) provided to the iron core piece (A) are tapered holes that are opened outward, and the locking portions are formed by resin to be filled in the tapered holes.

According to a sixth aspect of the present invention, in the laminated core of the fourth aspect of the present invention, the resin holes (B) provided to the iron core piece (A) consist of stepped holes formed by large-diameter portions and small-diameter portions, the large-diameter portions being provided on the outer sides of the resin holes (B) and having diameters larger than those of resin holes (H) of the iron core pieces (U), the small-diameter portions being provided on the inner sides in a thickness direction of the iron core piece (A), and the locking portions are formed by resin to be filled in the stepped holes.

According to a seventh aspect of the present invention, in the laminated cores of the first to sixth aspects of the present invention, the iron core piece (A) consists of one or more iron core pieces.

According to an eighth aspect of the present invention, a laminated core includes unitary laminated cores each having a plurality of iron core pieces and provided with a plurality of resin holes (e.g., formed at determinate radial positions at equal angles), the plurality of iron core pieces being laminated, the plurality of resin holes being communicated in an axial direction, the unitary laminated cores being multi-bonded through resin filled in the resin holes, and
the unitary laminated cores are arranged in a rotational lamination manner, and diameters of resin holes of iron core pieces on one or both ends in the axial direction of each of the unitary laminated cores are made larger than diameters of resin holes of the other iron core pieces.

According to a ninth aspect of the present invention, a method for manufacturing a laminated core includes the steps of: arranging a laminated core between a resin injection mold and a receiving mold, the laminated core having iron core pieces (A) and a plurality of iron core pieces (U), the iron core pieces (A) being provided on both ends in an axial direction, the plurality of iron core pieces (U) being provided in between the iron core pieces (A), the laminated core being formed by laminating the foregoing iron core pieces and having resin holes communicated in a laminating direction; press-holding the laminated core; and filling resin in the resin holes from resin pots provided to the resin injection mold,
the method further includes the steps of: providing empty space portions at parts where the resin injection mold is in contact with the resin holes, the empty space portions being continued to the resin holes; covering resin shortage formed on at least one of the iron core pieces (A) on ends in an axial direction of the laminated core by resin to be filled in the empty space portions; and filling resin in resin holes (B) of the iron core pieces (A) with no shortage.

According to a tenth aspect of the present invention, in the method for manufacturing a laminated core of the ninth aspect of the present invention, diameters of the empty space portions are larger than those of the resin holes (B) of the iron core pieces (A), forming locking portions on ends of resin filling the resin holes of the laminated core.

According to an eleventh aspect of the present invention, in the method for manufacturing a laminated core of the tenth aspect of the present invention, the diameters of the resin holes (B) of the iron core pieces (A) are smaller than those of the resin holes (H) of the iron core pieces (U).

Advantageous Effects of Invention

In the laminated cores according to the first to third aspects of the present invention, since the junction area of the iron core piece (A) and resin is made larger than the junction area of the iron core piece (U) and resin, the iron core piece (A) being provided on the end in the axial direction, the iron core piece (U) being provided at the position other than the end in the axial direction, joint strength of the iron core piece (A) provided on the end can be acquired, which can prevent the detachment of the iron core piece (A).

Especially, in the laminated core according to the second aspect of the present invention, since the cross-sectional area of the resin hole (B) of the iron core piece (A) is made larger than that of the resin hole (H) of the iron core piece (U), an area in which resin comes in contact with the iron core piece (A) becomes increased, which definitely increases the joint strength of the iron core piece (A).

In the laminated core according to the third aspect of the present invention, since the diameter of the resin hole (B) of the iron core piece (A) is made smaller than that of the resin hole (H) of the iron core piece (U), resin projecting from an endmost iron core piece (U) is in contact with one side of the iron core piece (A), which consequently, on specific conditions, increases the junction area of the resin and enhances the joint strength.

In the laminated cores according to the fourth to sixth aspects of the present invention, since they are provided with the locking portions formed by resin to be filled in the resin holes (B) of the iron core pieces (A) on the ends in the axial direction, detachment of the iron core pieces (A) from the iron core pieces (U) provided at the positions other than the ends in the axial direction can be prevented.

In the laminated core according to the fifth aspect of the present invention, since the resin holes (B) provided to the iron core piece (A) are the tapered holes that are opened outward, the locking portions are formed by resin to be filled in the tapered holes, which enables to prevent the detachment of the iron core piece (A) with resin in a state of not projecting from the iron core piece (A).

In the laminated core according to the sixth aspect of the present invention, since the resin holes (B) provided to the iron core piece (A) consist of the stepped holes formed by the large-diameter portions and the small-diameter portions, the large-diameter portions being provided on the outer sides of the resin holes (B) and having the diameters larger than those of the resin holes (H) of the iron core pieces (U), the small-diameter portions being provided on the inner sides in the thickness direction of the iron core piece (A), and since the locking portions are formed by resin to be filled in the stepped holes, the locking portions can be formed with resin in a state of not projecting from the iron core piece (A), enabling to prevent the detachment of the iron core piece (A).

In the laminated core according to the seventh aspect of the present invention, the iron core piece (A) consists of one or more iron core pieces, and especially when the iron core piece (A) consists of two or more iron core pieces, joint strength of the iron core pieces becomes increased.

In the laminated core according to the eighth aspect of the present invention, since the unitary laminated cores are arranged in a rotational lamination manner, and the diameters of the resin holes formed in the iron core pieces on one or both ends in an axial direction of each of the unitary laminated cores are made larger than the diameters of the resin holes of the other iron core pieces, bonding force among the unitary laminated cores becomes increased. Furthermore, since the unitary laminated cores are connected by resin, eddy current among the unitary laminated cores can be prevented.

In the methods for manufacturing a laminated core according to the ninth to eleventh aspects of the present invention, since the empty space portions continued to the resin holes are provided at the parts where the resin injection mold is in contact with the resin holes, and since the resin shortage formed on at least one of the iron core pieces (A) on ends in an axial direction of the laminated core is covered by resin to be filled in the empty space portions, the resin holes (B) of the iron core pieces (A) become filled with resin with no shortage and the junction areas of the iron core pieces (A) and resin become increased as well.

Especially, in the methods for manufacturing a laminated core according to the tenth and eleventh aspects of the present invention, since the diameters of the empty space portions are larger than those of the resin holes (B) of the iron core pieces (A), and the locking portions are formed on the ends of resin filling the resin holes of the laminated core, joint strength of the iron core pieces increases. The iron core pieces (A) become infallibly locked by the locking portions and do not fall away.

BRIEF DESCRIPTION OF DRAWINGS

FIG. 9(A) is a partial cross-sectional view of a laminated core according to a tenth embodiment of the present invention; and 9(B) is a partial cross-sectional view of a laminated core according to an eleventh embodiment of the present invention.

DESCRIPTION OF EMBODIMENTS

Next, with reference to the accompanying drawings, descriptions will be given on embodiments of the present invention. The following embodiments will describe an iron core piece on one side (specifically, an upper end) of a laminated core, however, an iron core piece on the other side (specifically, a lower end) may have the same structure. Moreover, in the following embodiments, descriptions will be given mainly on a laminated stator core, however, the same descriptions also apply to a laminated rotor core.

Additionally, in the present invention including the following embodiments, iron core pieces on ends in an axial direction are referred to as iron core pieces (A), and all other iron core pieces are referred to as iron core pieces (U). When simply referred to as "iron core pieces," there are a case where the iron core pieces (A) and the iron core pieces (U) are included, and another case where the term is used to collectively indicate iron core pieces in general.

In the present invention, a laminated core includes cases where iron core pieces are simply laminated, where iron core pieces are joined by caulking, and where iron core pieces are joined by resin inserted into resin holes.

Also, when simply referred to as "resin holes," there are cases where the term indicates resin holes of iron core pieces, and where the term indicates communication holes of a laminated core in which a plurality of iron core pieces are laminated.

Figure 1A:
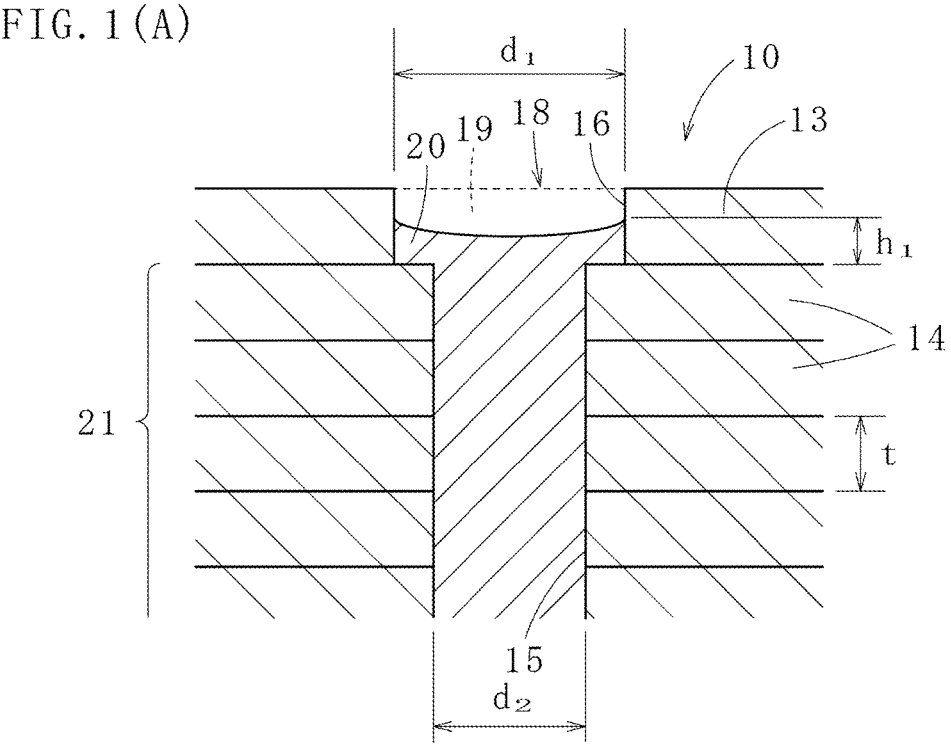
FIG. 1(A) is a partial cross-sectional view of a laminated core according to a first embodiment of the present invention; and 1(B) is a partial cross-sectional view of a laminated core according to a variation of the same embodiment.
Figure 2:
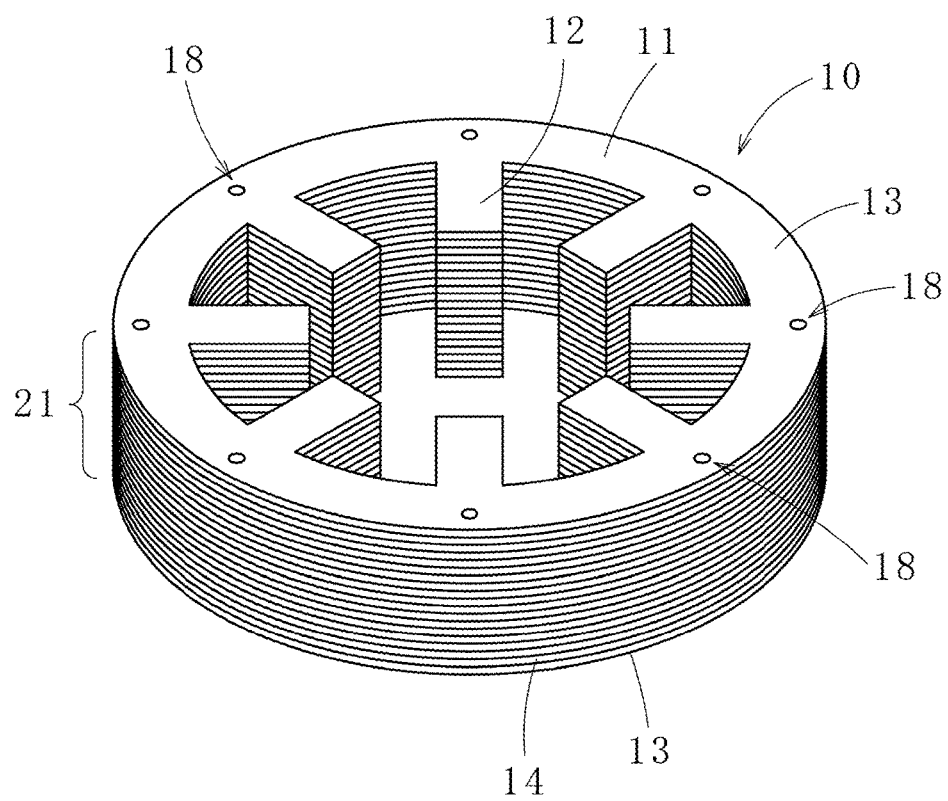
FIG. 2 is a perspective view of the laminated core according to the first embodiment of the present invention.

As illustrated in FIGS. 1(A) and 2, a laminated core 10 according to a first embodiment of the present invention is formed by laminating iron core pieces (A) 13 and iron core pieces (U) 14, the iron core pieces (A) 13 each having an annular yoke piece portion 11 and a plurality of pole piece portions 12 formed on the inner side of the yoke piece portion 11, the iron core pieces (U) 14 having the same external form as that of the iron core pieces (A) 13. Here, the iron core pieces (A) 13 are provided on both ends in an axial direction of the laminated core 10. The iron core pieces (U) 14 are provided in a plurality and arranged between the iron core pieces (A) 13 to be arranged on the ends in a laminating direction (the inner side in the axial direction). It is preferred that an iron core piece (A) consists of a single iron core piece (A), however, two or more iron core pieces (A) are laminated in some cases.

In yoke piece portions 11 of the iron core pieces (U) 14, there are a plurality (the same applies to the following embodiments) of resin holes (H) 15 formed along a circumferential direction, and in the yoke piece portions 11 of the iron core pieces (A) 13, there are resin holes (B) 16 formed with axes thereof aligned with axes of the resin holes (H) 15. Diameters d1 of the resin holes (B) 16 are larger than diameters d2 of the resin holes (H) 15. More specifically, a cross-sectional area of a resin hole (B) 16 is larger than that of a resin hole (H) 15. Here, when a height of resin remained in a resin hole (B) 16 is indicated by h1, an area in which resin is in contact with the resin hole (B) 16 of an iron core piece (A) 13 is solved by, a contact area (junction area) $S1=\pi d1 \times h1$, and an area in which resin is in contact with a resin hole (H) 15 of an iron core piece (U) 14 is solved by (junction area) $S2=\pi d2 \times t$ (t is a thickness of an iron core piece). Enlarging d1 enables S1>S2. This can make the joining of the iron core pieces (A) 13 to a laminated core body 21 more solid. Additionally, resin in the iron core piece (A) 13 is in contact with an upper surface of the iron core piece (U) 14 by an area of $\pi(d1^2-d2^2)/4$, and resin inside the resin holes (B) 16 functions as stoppers.

These iron core pieces (A) 13 and iron core pieces (U) 14 are, after being stamped out and formed by a mold, positioned and laminated on an unillustrated carrying tray, arranged between a resin injection mold and a resin receiving mold that are arranged opposed to each other, and press-held. Then, by resin discharged from resin pots provided to the resin injection mold, a plurality of resin holes 18 penetrating the laminated core 10 in the laminating direction become resin-sealed. The iron core pieces (A) 13 and the iron core pieces (U) 14 are thereby communicated in the laminating direction (this operation is the same in other embodiments as well).

As illustrated in FIG. 1(A), resin is filled up to an outer surface position of an iron core piece (A) 13, however, by a process of resin's changing from a liquid to a solid form and shrinkage after becoming a solid form, empty space portions 19 become formed on the outer surface side of the iron core piece (A) 13. The number 20 indicates shrunk resin, however, since S1>S2 has to be accomplished, the diameters d1 have to be larger than a predetermined value.

Figure 1B:
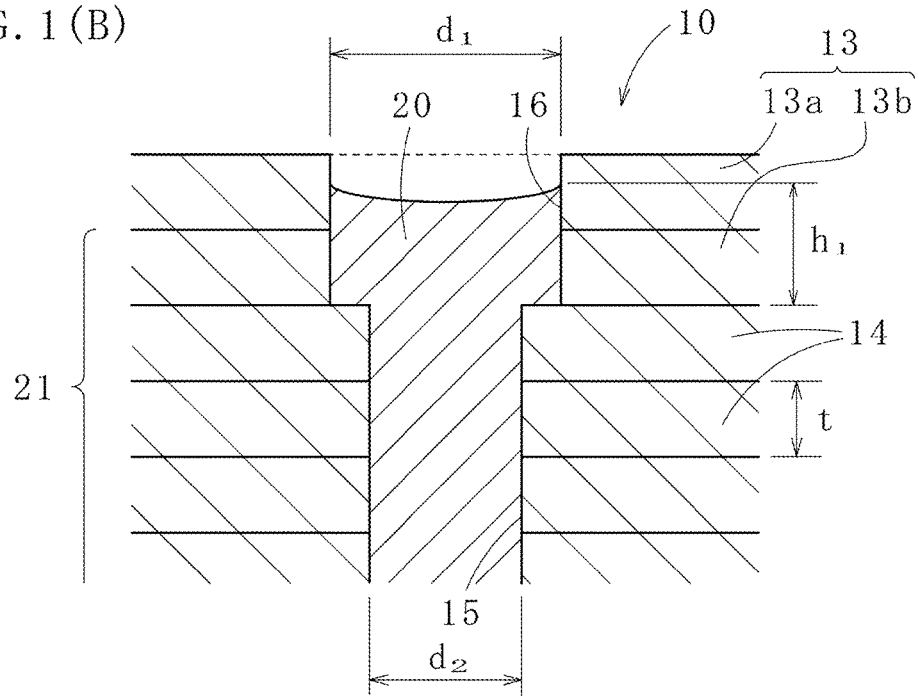

As illustrated in FIG. 1(B), an iron core piece (A) 13 can consist of a plurality (in this embodiment, two) of iron core pieces (A) 13a and 13b. In this case, the iron core pieces (A) 13a and (A) 13b are joined more solidly to the iron core pieces (U) 14 at enlarged-diameter parts of the resin holes (B) 16 of the iron core pieces (A) 13*a* and (A) 13*b* through large-diameter shrunk resin (solidified resin) 20.

Figure 3:
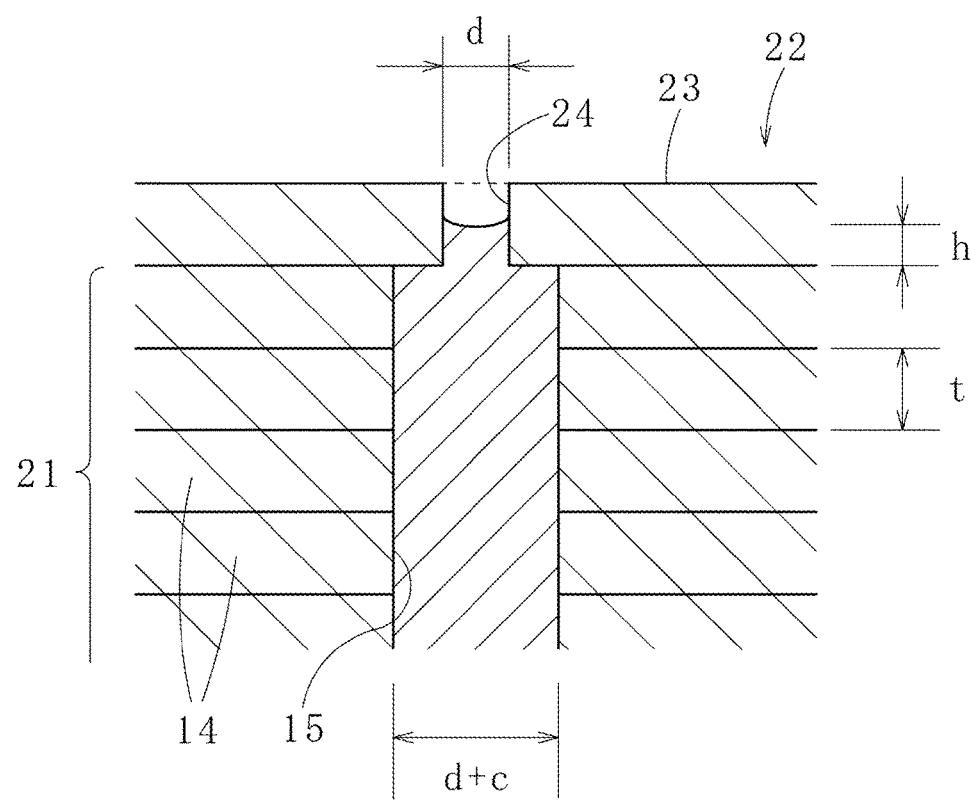
FIG. 3 is a partial cross-sectional view of a laminated core according to a second embodiment of the present invention.

Next, with reference to FIG. 3, descriptions will be given on a laminated core 22 according to a second embodiment of the present invention. In the case of this laminated core 22, when diameters of resin holes (B) 24 of an iron core piece (A) 23 on an end in an axial direction are indicated by d, an adherence height of resin is indicated by h, diameters of resin holes (H) 15 of iron core pieces (U) 14 on the inner side of the iron core piece (A) 23 are indicated by (d+c), and each thickness of the resin holes (H) 15 is indicated by t, a junction area S3 where resin adheres to the iron core piece (A) 23 is "$\pi(2dc+c^2)/4+\pi dh$," and a junction area S4 where resin adheres to a resin hole (H) 15 is $\pi t(d+c)$. Thus, in the case of S3>S4, adherence strength of the iron core piece (A) 23 increases, making the iron core piece (A) 23 less prone to the detachment from a laminated core body 21. In the laminated core 22, there is an advantage that a usage amount of resin is relatively small.

Figure 4A:
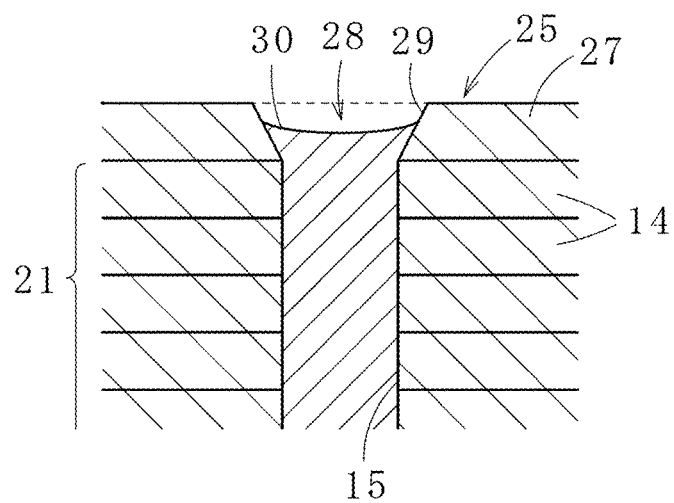
FIG. 4(A) is a partial cross-sectional view of a laminated core according to a third embodiment of the present invention; 4(B) is a partial cross-sectional view of a laminated core according to a variation of the same embodiment; and 4(C) is a partial cross-sectional view of a laminated core according to a fourth embodiment of the present invention.

With reference to FIG. 4(A), descriptions will be given on a laminated core 25 according to a third embodiment of the present invention. In the case of the laminated core 25, a plurality of iron core pieces, i.e., iron core pieces (A) 27 and iron core pieces (U) 14, are laminated, and each of the iron core pieces is connected in a laminating direction by filling resin in a plurality of resin holes 28 penetrating the laminated core 25 in the laminating direction. Resin holes (B) 29 of an iron core piece (A) 27 are tapered holes opened outward, and locking portions 30 become formed by resin to be filled, preventing the iron core piece (A) 27 from being detached from the iron core pieces (U) 14 provided at positions other than ends in an axial direction, i.e., a laminated core body 21.

Figure 4B:
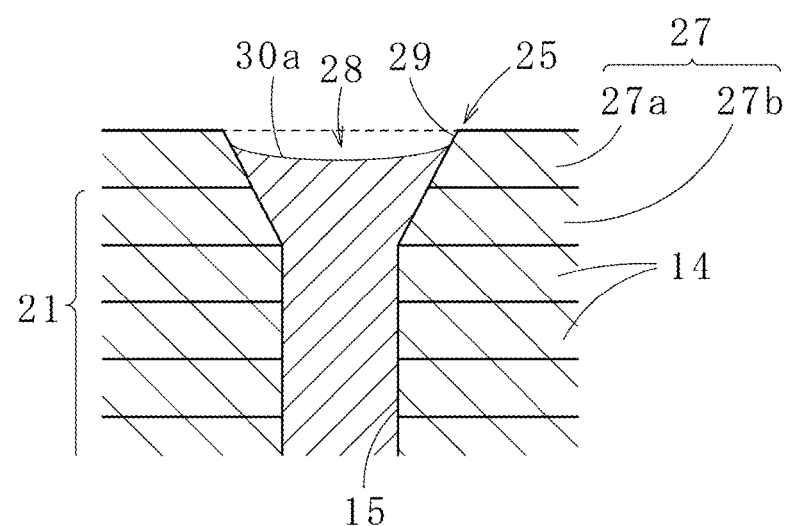

FIG. 4(B) illustrates a variation of the laminated core 25 according to the third embodiment. The iron core piece (A) 27 consists of a plurality (in this embodiment, two) of iron core pieces (A) 27*a* and (A) 27*b*. Comparatively-large locking portions 30*a* thereby become formed, enabling to join the iron core pieces (A) 27*a* and (A) 27*b* to the iron core pieces (U) 14.

Figure 4C:
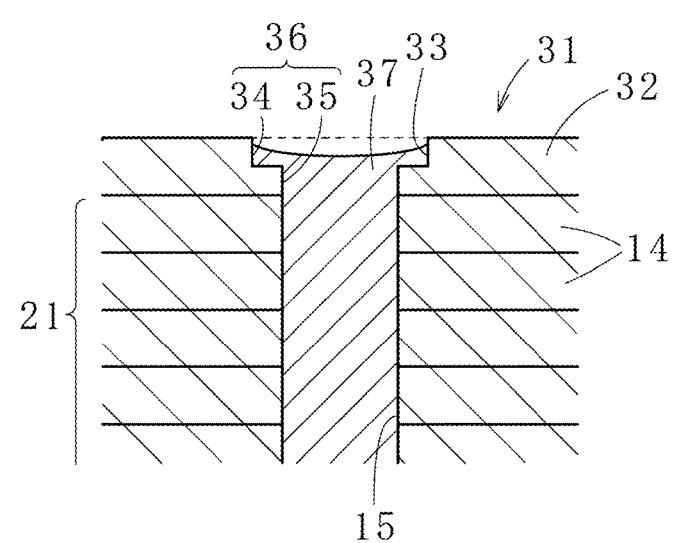

FIG. 4(C) illustrates a laminated core 31 according to a fourth embodiment of the present invention. Resin holes (B) 33 provided to an iron core piece (A) 32 consist of stepped holes 36 formed by large-diameter portions 34 and small diameter portions 35, and locking portions 37 are formed by resin to be filled in the stepped holes 36, the large-diameter portions 34 being provided on the outer sides in axial directions of the resin holes (B) 33 and having diameters larger than those of resin holes (H) 15 of iron core pieces (U) 14, the small-diameter portions 35 being provided on the inner sides in thickness directions of the iron core piece (A) 32. This prevents the iron core piece (A) 32 from being detached from a laminated core body 21. Also, in this embodiment, the diameters of the small-diameter portions 35 are the same as those of the resin holes (H) 15.

Figure 5:
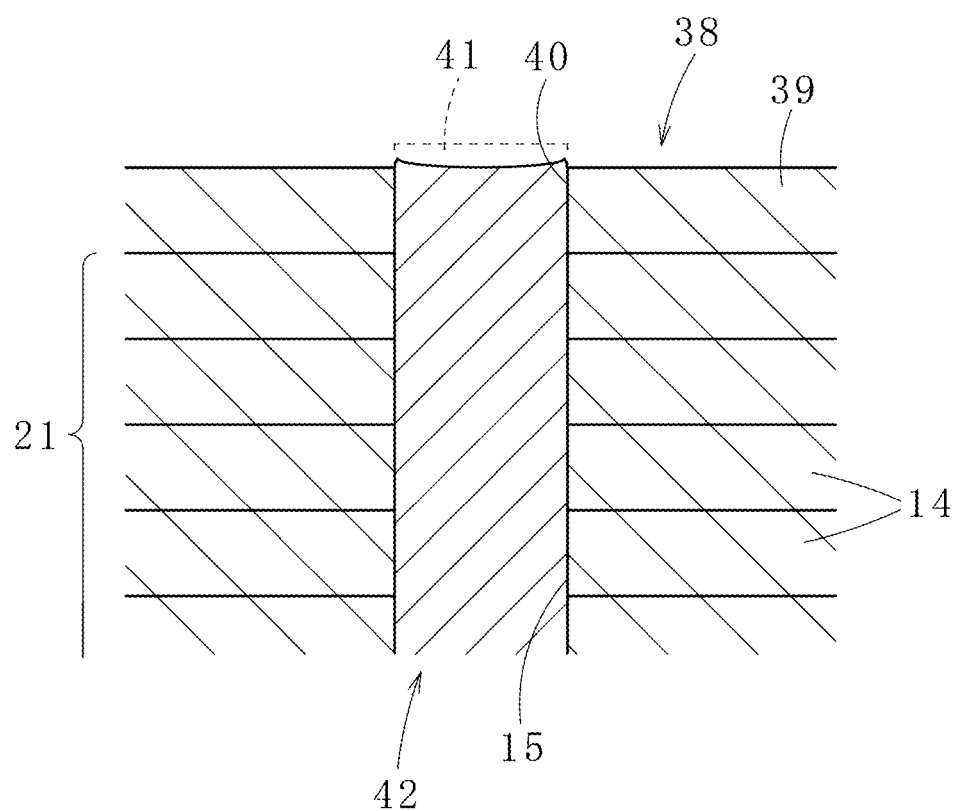
FIG. 5 is a partial cross-sectional view of a laminated core according to a fifth embodiment of the present invention.

FIG. 5 illustrates a laminated core 38 according to a fifth embodiment of the present invention. Resin to be filled in resin holes (B) 40 extends to an outer end surface of an iron core piece (A) 39 on an end in an axial direction. The iron core piece (A) 39 thereby also comes in contact with resin under the same condition as other iron core pieces (U) 14, acquiring joint strength of the iron core piece (A) 39 to the resin and making the iron core piece (A) 39 less prone to the detachment from a laminated core body 21.

In a method for manufacturing the laminated core 38, empty space portions 41 continued to the resin holes (B) 40 are provided at parts where a resin injection mold comes in contact with the resin holes (B) 40, and resin to be filled in the empty space portions 41 cover resin shortage formed on at least one of the iron core pieces (A) 39 on ends in the axial direction of the laminated core 38. The resin holes (B) 40 of the iron core piece (A) 39 thereby become filled with resin with no shortage.

Each horizontal cross-sectional area of the empty space portions 41 in this case becomes equal to each horizontal cross-sectional area of the resin holes (H) 15 formed in the iron core pieces (U) 14, and heights of the empty space portions 41 are made to accord with or made slightly larger than a shrinkage amount of resin filled in resin holes 42 of the laminated core 38.

Figure 6A:
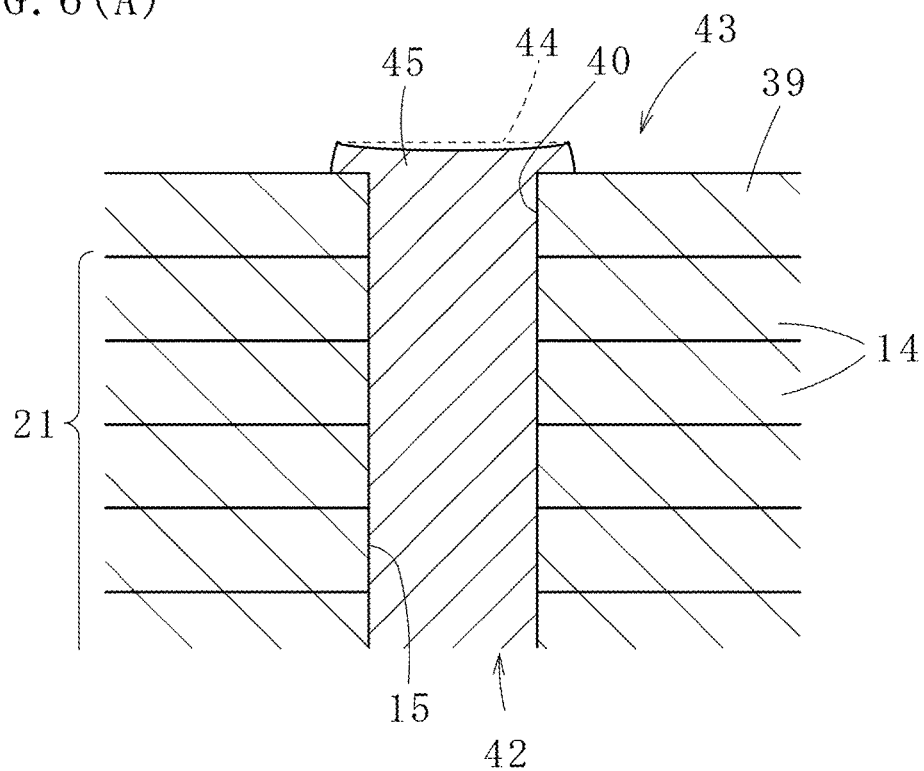
FIG. 6(A) is a partial cross-sectional view of a laminated core according to a sixth embodiment of the present invention; and 6(B) is a partial cross-sectional view of a laminated core according to a seventh embodiment of the present invention.

FIG. 6(A) illustrates a laminated core 43 according to a sixth embodiment of the present invention. Empty space portions 44, which are the empty space portions 41 in the laminated core 38 according to the fifth embodiment of which the diameters are made larger than those of the resin holes (B) 40, are used. A manufacturing method thereof is the same as that of the laminated core 38.

Resin filled in these empty space portions 44 (outer ends in the axial directions of resin filling resin holes 42) becomes locking portions 45, preventing an iron core piece (A) 39 from being detached from a laminated core body 21.

Figure 6B:
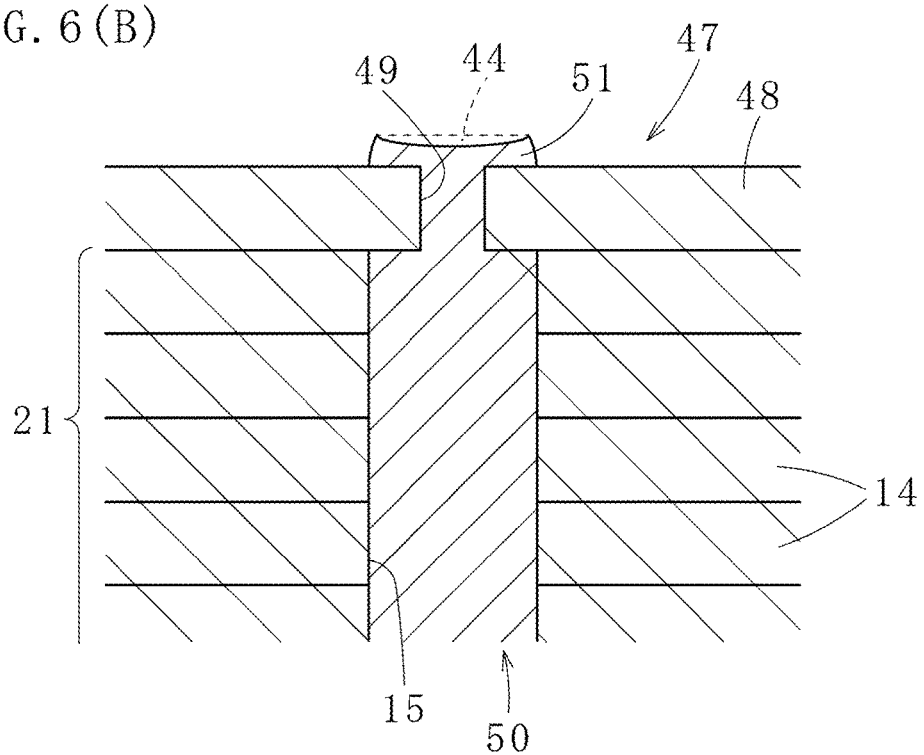

FIG. 6(B) illustrates a laminated core 47 according to a seventh embodiment of the present invention. Diameters of resin holes (B) 49 of iron core pieces (A) 48 on both ends of the laminated core 47 are smaller than those of resin holes (H) 15 of other iron core pieces (U) 14, forming narrow parts at portions of resin holes 50 passing through the laminated core 47. Outer ends in the axial direction of resin thereby form locking portions 51, preventing the iron core pieces (A) 48 from being detached.

Figure 7A:
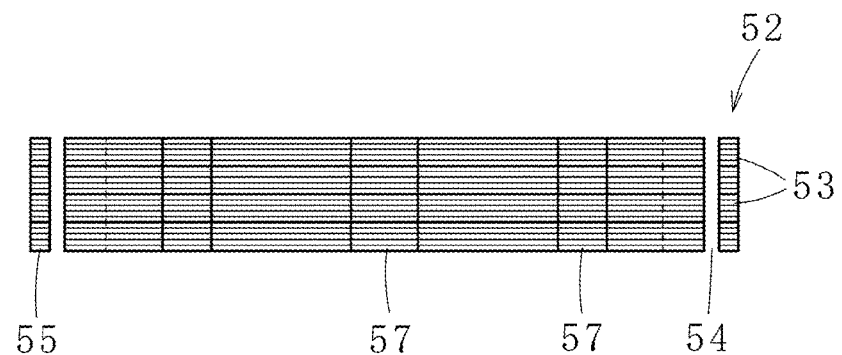
FIG. 7(A) is a cross-sectional view of a laminated core according to an eighth embodiment of the present invention; and 7(B) is a perspective view of the same laminated core.
Figure 7B:
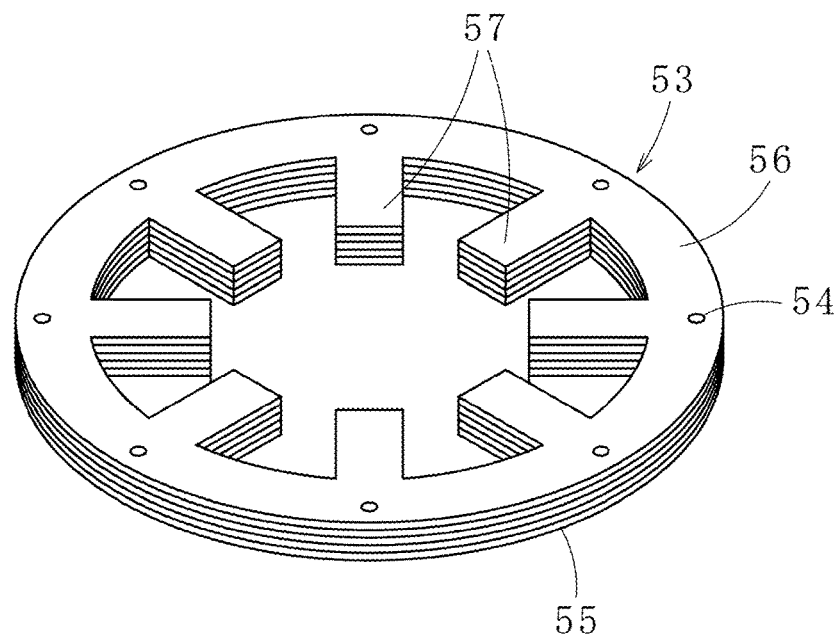

FIGS. 7(A) and 7(B) illustrate a laminated core 52 according to an eighth embodiment of the present invention. In the case of the laminated core 52, a plurality of unitary laminated cores 53 in which iron core pieces are caulked and laminated through unillustrated caulking portions are integrated by rotating the unitary laminated cores 53 by 45, 90 or 180 degrees and laminating them, aligning positions of resin holes 54 of each of the unitary laminated cores 53, positioning and arranging the unitary laminated cores 53 between a resin injection mold and a receiving mold, and pouring resin from resin pots provided to the resin injection mold into the resin holes 54 communicated in a laminating direction. Each of the unitary laminated cores 53 is thereby insulated, preventing generation of eddy-current loss. The resin holes 54 are formed equiangularly in a circumferential direction (360/n, n is an integer) and at the same radial positions. The unitary laminated cores 53 are manufactured independently from one another.

In each of the unitary laminated cores 53, an iron core piece 55 at the lowest part does not have caulking projections, and instead has caulking holes in which caulking projections of an iron core piece lying directly above become inserted. Each of the resin holes 54 is provided in annular yoke portions 56 along a circumferential direction at equal angles, and there are magnetic pole portions 57 provided on the inner sides of the yoke portions 56. In this embodiment, the unitary laminated cores 53 are caulked and laminated, however, each iron core piece can also be joined by other means, resin holes, an adhesive, welding and the like.

Figure 8:
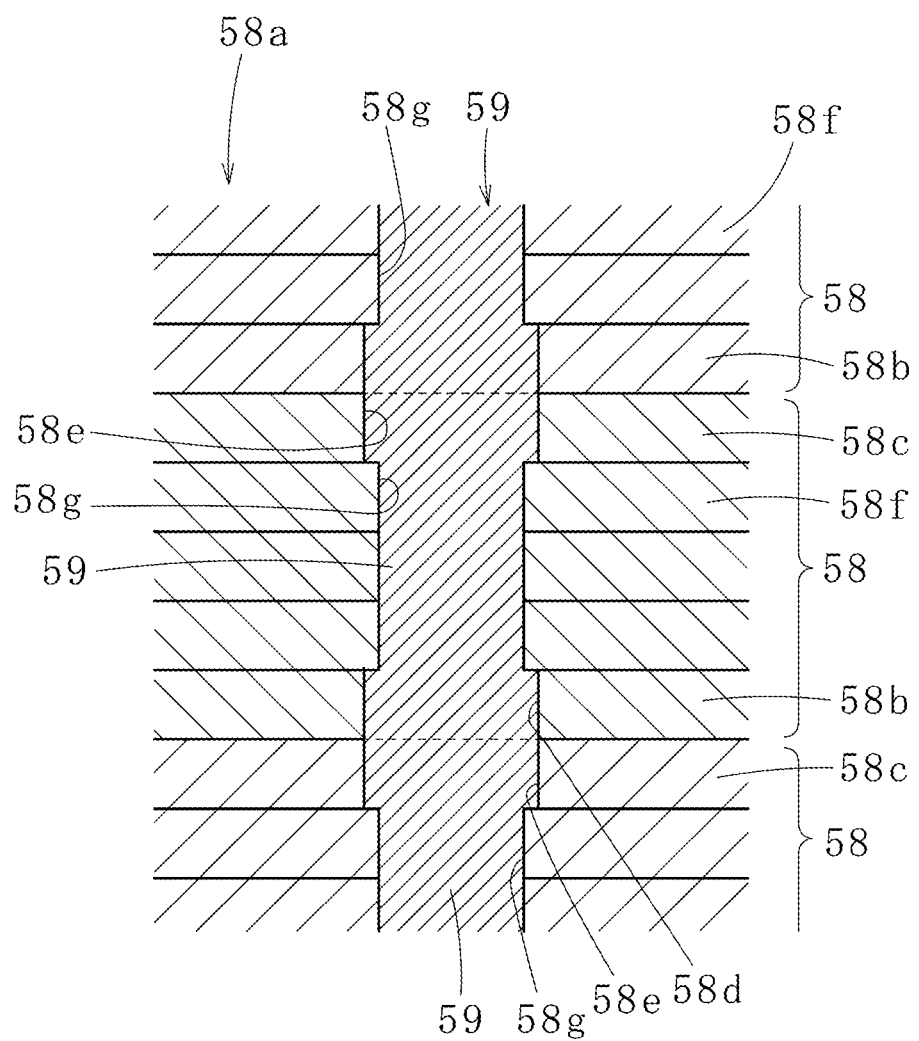
FIG. 8 is a partial cross-sectional view of a laminated core according to a ninth embodiment of the present invention.

FIG. 8 illustrates a laminated core 58*a* according to a ninth embodiment of the present invention in which a plurality of unitary laminated cores 58 are joined. Each of the unitary laminated cores 58 is in the same form, and axial centers of resin holes 59 of the unitary laminated cores 58 are on the same straight line. More specifically, the resin holes 59 vertically penetrating in a laminating direction exist on the same axial center.

However, diameters of resin holes 58d and 58e of iron core pieces 58b and 58c positioned on both ends in the laminating direction of the unitary laminated cores 58 are larger than diameters of resin holes 58g of other iron core pieces 58f. This increases junction areas of resin in the resin holes 58d, 58e, which increases joining force among the unitary laminated cores 58.

FIG. 9(A) illustrates a laminated core 61 according to a tenth embodiment of the present invention. In the case of the laminated core 61, a plurality of unitary laminated cores 62 are prepared, and resin holes 62a provided to each of the unitary laminated cores 62 are communicated with one another through the plurality of unitary laminated cores 62. Each of the unitary laminated cores 62 is laminated in a rotational lamination manner, and diameters of resin holes 65 and 66 of iron core pieces 63 and 64 provided on both ends of the unitary laminated cores 62 are larger than diameters of resin holes 68 of other iron core pieces 67. Locking portions are thereby formed by resin to be filled in the resin holes 65 and 66, and junction areas of resin and the iron core pieces 63, 64 increase accordingly, strengthening bonding force of the unitary laminated cores 62 adjacent to one another in a laminating direction.

FIG. 9(B) illustrates a laminated core 69 according to an eleventh embodiment of the present invention. A plurality of unitary laminated cores 70 are stacked while being rotated and laminated. The unitary laminated cores 70 are connected by resin filled in resin holes 71. In this case, axial centers of the resin holes 71 of the unitary laminated cores 70 are shifted in a slight range (e.g., 0.1- to 0.3-fold of each diameter), the unitary laminated cores 70 being in contact with one another in a laminating direction, and diameters of resin holes 73 of iron core pieces 72 on an end of one side of each of the unitary laminated cores 70 are larger than diameters of resin holes 74a of other iron core pieces 74. Consequently, locking portions are formed by resin to be filled in the diameter-enlarged resin holes 73 of the iron core pieces 72, and bonding force of the unitary laminated cores 70 adjacent to one another in the laminating direction increases.

Figure 10:
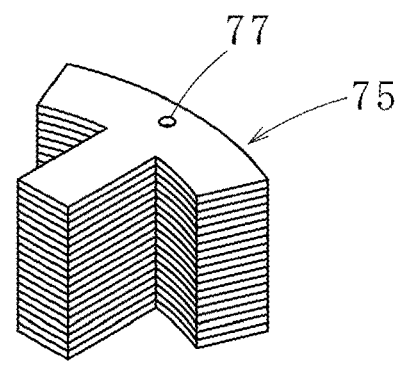
FIG. 10(A) is a perspective view of a laminated core according to a twelfth embodiment of the present invention; and 10(B) is a plan view of the same laminated core.
Figure 10:
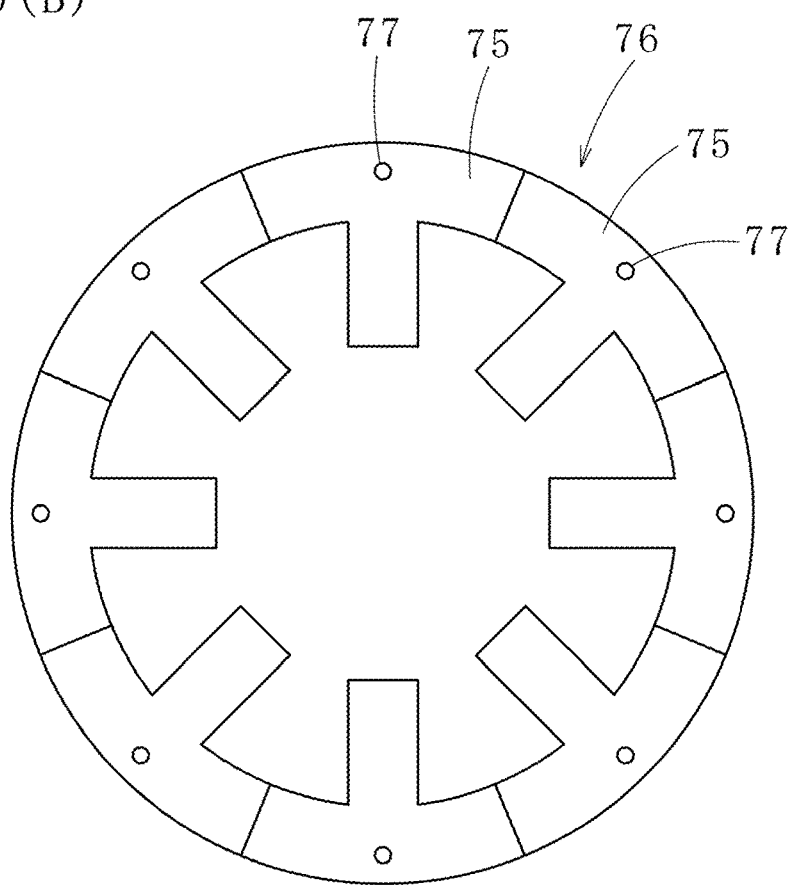

FIG. 10(A) illustrates a divided laminated core 75 which is an example of a laminated core according to a twelfth embodiment of the present invention. By a plurality of divided laminated cores 75, as illustrated in FIG. 10(B), an annular laminated core 76 is formed. These divided laminated cores 75 also have resin holes 77, and are connected by resin to prevent the generation of eddy current. As a feature or a method for connecting iron core pieces of each divided laminated core 75 in a laminating direction, the techniques applied to the laminated cores according to the first to seventh aspects of the present invention described hereinbefore can be used (the same applies to the following embodiments).

Figure 11:
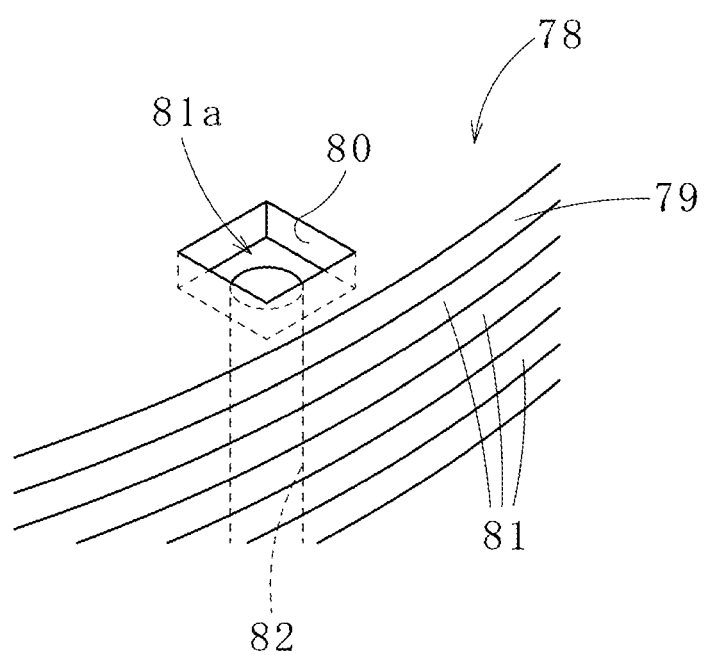
FIG. 11 is a partial perspective view of a laminated core according to a thirteenth embodiment of the present invention.

FIG. 11 illustrates a laminated core 78 according to a thirteenth embodiment of the present invention. In the case of the laminated core 78, resin holes (B) 80 of an iron core piece (A) 79 to be arranged on an end in an axial direction have a non-circular (specifically, rectangular, polygonal or ellipsoidal) shape in planar view. Axial centers of the resin holes (B) 80 and axial centers of resin holes (H) 82 of other iron core pieces (U) 81 are aligned with one another, and cross-sectional areas of the resin holes (B) 80 are larger than cross-sectional areas of the resin holes (H) 82. Therefore, when resin is filled in resin holes 81a penetrating the laminated core 78 in the laminating direction, resin filled in the resin holes (B) 80 on the surface side becomes locking portions, which play the roles of stoppers.

Figure 12:
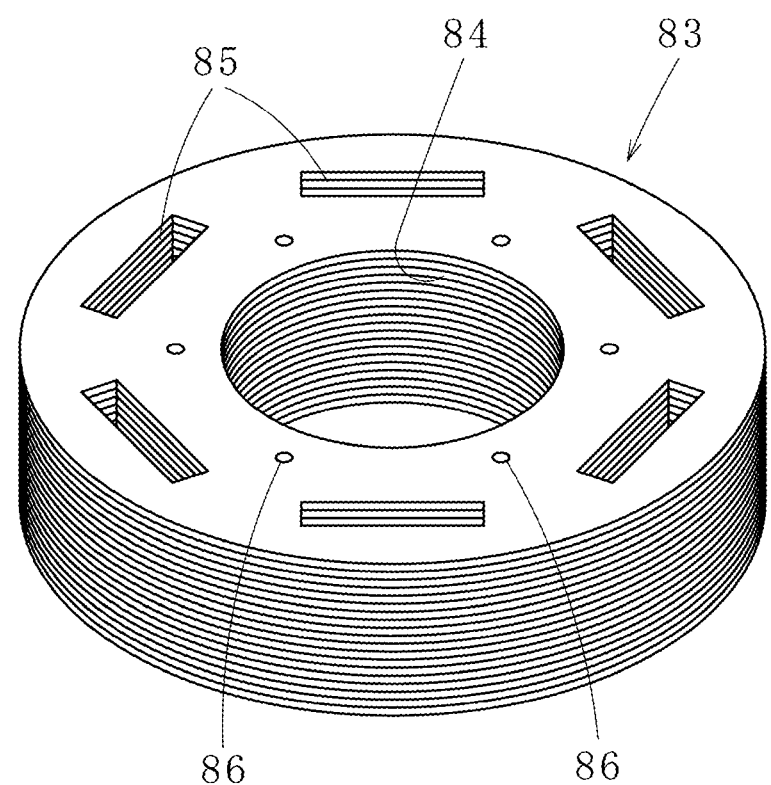
FIG. 12 is a perspective view of a laminated core according to a fourteenth embodiment of the present invention.
Figure 13A:
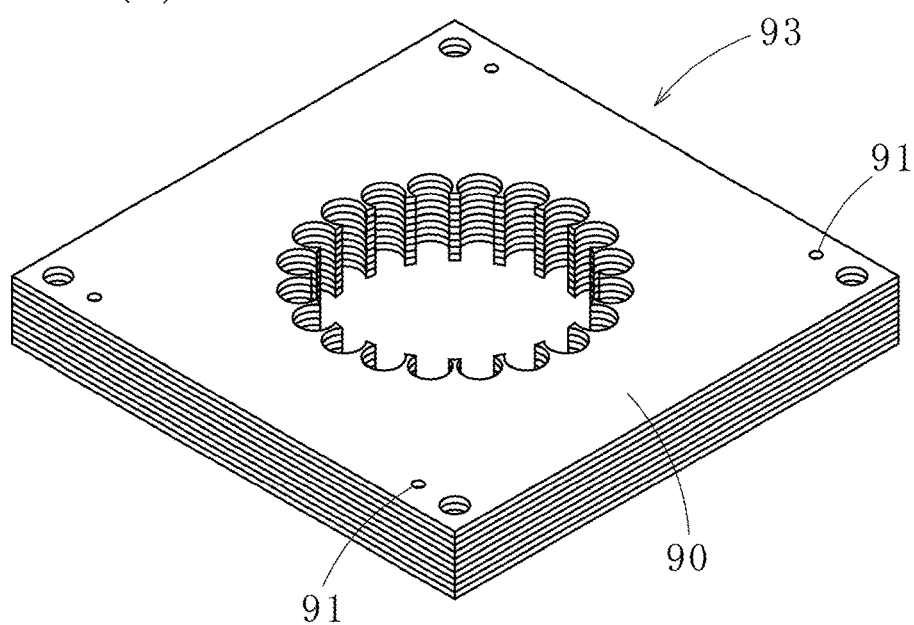
FIG. 13(A) is a perspective view of a laminated core according to a conventional example; and 13(B) is a cross-sectional view of the same laminated core.
Figure 13B:
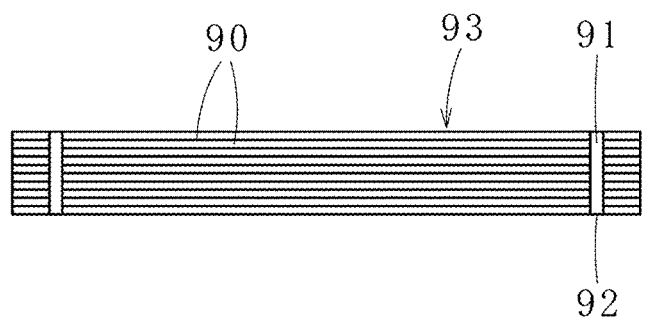
Figure 14A:
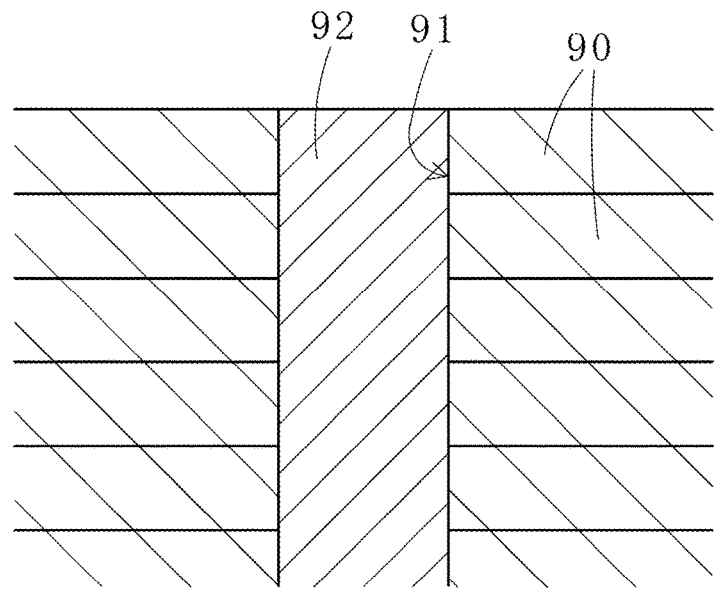
FIGS. 14(A) and 14(B) are cross-sectional views each illustrating a connected state of a laminated core connected by using resin according to a conventional example.
Figure 14B:
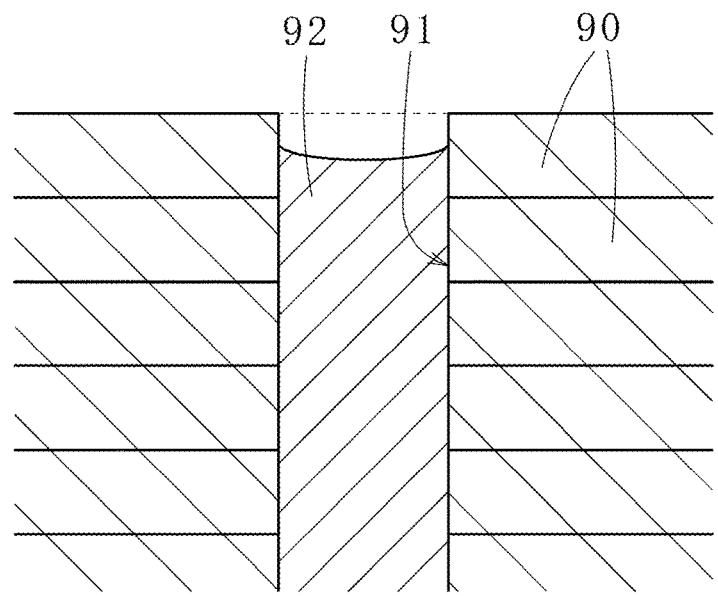

FIG. 12 illustrates a laminated core (laminated rotor core) 83 according to a fourteenth embodiment of the present invention. The laminated core 83 has a shaft hole 84 in the center thereof and a plurality of magnet insertion holes 85 around the shaft hole 84. Each of the iron core pieces forming the laminated core 83 is provided with resin holes, thereby forming resin holes 86 penetrating the laminated core 83 in a laminating direction. Resin becomes filled in the resin holes 86 and the magnet insertion holes 85, and the resin connects each of the iron core pieces.

Resin-filling in these magnet insertion holes 85 and the resin holes 86 is performed by arranging the laminated core 83 between a resin injection mold and a receiving mold, the laminated core 83 having permanent magnets inserted into the magnet insertion holes 85, press-holding the laminated core 83 by the resin injection mold and the receiving mold, and simultaneously injecting resin from resin pots (resin reservoir pots) provided to the resin injection mold into the magnet insertion holes 85 and the resin holes 86. The laminated core 83 may be arranged between the resin injection mold and the receiving mold in a state of being mounted on a carrying tray, and a dummy plate (cull plate) which enables the easy detachment of sealed resin may be arranged.

The present invention is not limited to the above embodiments, and changes in forms and numbers may be made without altering the gist of the present invention. Furthermore, the present invention is also applicable in the case of forming each feature for increasing the joint strength of iron core pieces at both ends in an axial direction of a laminated core by combining the embodiments according to the first to fourteenth aspects of the present invention.

REFERENCE SIGNS LIST

10: laminated core, 11: yoke piece portion, 12: pole piece portion, 13, 13a, 13b: iron core piece (A), 14: iron core piece (U), 15: resin hole (H), 16: resin hole (B), 18: resin hole, 19: empty space portion, 20: shrunk resin, 21: laminated core body, 22: laminated core, 23: iron core piece (A), 24: resin hole (B), 25: laminated core, 27, 27a, 27b: iron core piece (A), 28: resin hole, 29: resin hole (B), 30, 30a: locking portion, 31: laminated core, 32: iron core piece (A), 33: resin hole (B), 34: large-diameter portion, 35: small-diameter portion, 36: stepped hole, 37: locking portion, 38: laminated core, 39: iron core piece (A), 40: resin hole (B), 41: empty space portion, 42: resin hole, 43: laminated core, 44: empty space portion, 45: locking portion, 47: laminated core, 48: iron core piece (A), 49: resin hole (B), 50: resin hole, 51: locking portion, 52: laminated core, 53: unitary laminated core, 54: resin hole, 55: iron core piece, 56: yoke portion, 57: magnetic pole portion, 58: unitary laminated core, 58a: laminated core, 58b, 58c: iron core piece, 58d, 58e: resin hole, 58f: iron core piece, 58g: resin hole, 59: resin hole, 61: laminated core, 62: unitary laminated core, 62a: resin hole, 63, 64: iron core piece, 65, 66: resin hole, 67: iron core piece, 68: resin hole, 69: laminated core, 70: unitary laminated core, 71: resin hole, 72: iron core piece, 73: resin hole, 74: iron core piece, 74a: resin hole, 75: divided laminated core, 76: laminated core, 77: resin hole, 78: laminated core, 79: iron core piece (A), 80: resin hole (B), 81: iron core piece (U), 81*a*: resin hole, 82: resin hole (H), 83: laminated core, 84: shaft hole, 85: magnet insertion hole, 86: resin hole

The invention claimed is:

1. A laminated core, comprising:
a plurality of laminated iron core pieces, wherein each of the iron core pieces being connected in a laminating direction by filling a resin in a plurality of resin holes penetrating the laminated core in the laminating direction,
wherein an iron core piece (A) of the iron core pieces is provided at an end in an axial direction of the laminated core and an iron core piece (U) of the iron core pieces is all other iron core pieces being arranged in the axial direction;
wherein the laminated core is a laminated stator core; and
wherein joint strength of the iron core piece (A) is acquired by making a diameter (d1) of a resin hole (B) of the iron core piece (A) larger than a diameter (d2) of the resin hole (H) of the iron core piece (U) and making a junction area (S1) of the iron core piece (A) and resin that is larger than a junction area (S2) of the iron core piece (U) and resin; and
wherein the resin hole (B) and the resin hole (H) are on the same axis.

2. The laminated core according to claim 1, wherein the resin in the iron core piece (A) is in direct contact with an upper surface of the iron core piece (U) by an area of $\pi(d1^2-d2^2)/4$;
wherein d1 is a diameter of the resin hole (B) and d2 is a diameter of the resin hole (H).

3. The laminated core according to claim 1, wherein the resin present in resin hole (B) is a stopper.

4. A laminated core comprising:
a plurality of laminated iron core pieces, wherein each of the iron core pieces being connected in a laminating direction by filling a resin in a plurality of resin holes penetrating the laminated core in the laminating direction,
wherein the laminated core is a laminated stator core;
wherein an iron core piece (A) of the iron core pieces is provided at an end in an axial direction of the laminated core and an iron core piece (U) of the iron core pieces is all other iron core pieces being arranged in the axial direction; and
wherein joint strength of the iron core piece (A) is acquired by making a diameter of a resin hole (B) of the iron core piece (A) smaller than a diameter of the resin hole (H) of the iron core piece (U) and making a junction area (S1) of the iron core piece (A) and resin that is larger than a junction area (S2) of an iron core piece (U) and resin; and
wherein the resin hole (B) and the resin hole (H) are on the same axis.

5. A laminated core comprising:
a plurality of laminated iron core pieces, wherein each of the iron core pieces being connected in a laminating direction by filling a resin in a plurality of resin holes penetrating the laminated core in the laminating direction,
wherein an iron core piece (A) of the iron core pieces is provided at an end in an axial direction of the laminated core and an iron core piece (U) of the iron core pieces is all other iron core pieces being arranged in the axial direction;
wherein the laminated core is a laminated stator core;
wherein locking portions are provided in resin holes (B) of the iron core piece (A); and
wherein the resin holes (B) consist of stepped holes formed by large-diameter portions and small-diameter portions, the large-diameter portions being provided on the outer sides of the resin holes (B) and having diameters larger than diameters of resin holes (H) of the iron core pieces (U), the small-diameter portions being provided on the inner sides in a thickness direction of the iron core piece (A), and the locking portions are formed by resin to be filled in the stepped holes.

6. The laminated core according to claim 5, wherein the small-diameter portions have the same diameter as the diameter of the resin holes (H).

* * * * *